US010745625B2

(12) United States Patent
Dogterom et al.

(10) Patent No.: US 10,745,625 B2
(45) Date of Patent: Aug. 18, 2020

(54) PROCESS FOR PRODUCING HYDROCARBONS

(71) Applicant: SHELL OIL COMPANY, Houston, TX (US)

(72) Inventors: Ronald Jan Dogterom, Amsterdam (NL); Gerard Pieter Van Der Laan, Amsterdam (NL); Abderrahmane Chettouf, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/344,961

(22) PCT Filed: Oct. 27, 2017

(86) PCT No.: PCT/EP2017/077572
§ 371 (c)(1),
(2) Date: Apr. 25, 2019

(87) PCT Pub. No.: WO2018/078082
PCT Pub. Date: May 3, 2018

(65) Prior Publication Data
US 2019/0270937 A1 Sep. 5, 2019

(30) Foreign Application Priority Data
Oct. 27, 2016 (EP) ..................... 16195974

(51) Int. Cl.
| C10G 2/00 | (2006.01) |
| B01J 8/02 | (2006.01) |
| B01J 8/06 | (2006.01) |
| B01J 35/04 | (2006.01) |
| B01J 37/02 | (2006.01) |
| B01J 37/08 | (2006.01) |

(52) U.S. Cl.
CPC ............ *C10G 2/341* (2013.01); *B01J 8/0292* (2013.01); *B01J 8/065* (2013.01); *B01J 35/04* (2013.01); *B01J 37/0201* (2013.01); *B01J 37/0225* (2013.01); *B01J 37/0236* (2013.01); *B01J 37/08* (2013.01); *C10G 2/30* (2013.01); *C10G 2/344* (2013.01); *B01J 2208/024* (2013.01); *B01J 2208/06* (2013.01); *C10G 2300/1022* (2013.01)

(58) Field of Classification Search
None
See application file for complete search history.

(56) References Cited

U.S. PATENT DOCUMENTS

| 8,497,224 | B2 | 7/2013 | Dekker et al. |
| 8,747,769 | B2 | 6/2014 | Del-Gallo et al. |
| 2004/0044090 | A1 | 3/2004 | Font Freide et al. |
| 2004/0247501 | A1 | 12/2004 | Adusei et al. |
| 2012/0248377 | A1 | 10/2012 | Del-Gallo et al. |
| 2014/0004259 | A1 | 1/2014 | Walther et al. |
| 2016/0208175 | A1 | 7/2016 | Groppi et al. |

FOREIGN PATENT DOCUMENTS

| WO | 0207872 A1 | 1/2002 | |
| WO | 2006065127 A1 | 6/2006 | |
| WO | 2007000506 A1 | 1/2007 | |
| WO | WO-2016193337 A1 * | 12/2016 | ................ C02F 9/00 |

OTHER PUBLICATIONS

International Search Report and Written Opinion received for PCT Patent Application No. PCT/EP2017/077572, dated Jan. 19, 2018, 9 pages.
Fan, "Gas-Liquid-Solid Fluidization Engineering", Butterworths Series in Chemical Engineering, Chapter 4, 1989, pp. 199-202.

* cited by examiner

Primary Examiner — Medhanit W Bahta

(57) ABSTRACT

The present application relates to a process for producing normally gaseous, normally liquid, and optionally normally solid hydrocarbons from synthesis gas in a three-phase reactor, said reactor comprising a top middle and bottom part wherein the bottom and top part are fluidly connected via one or more reactor tubes, wherein one or more reactor tubes comprise randomly stacked catalyst bodies held stationary in the reactor tube and the reactor is at least partially filled with a liquid medium, said process comprising the steps of: (i) introducing the synthesis gas into the reactor via the bottom part; and (ii) contacting the synthesis gas with a stationary catalyst to catalytically convert the synthesis gas at an elevated temperature to obtain the normally gaseous, normally liquid, and optionally normally solid hydrocarbons from synthesis gas; (iii) withdrawing the normally gaseous, normally liquid, and optionally normally solid hydrocarbons; wherein the catalyst bodies have an open celled foam structure.

19 Claims, No Drawings

PROCESS FOR PRODUCING HYDROCARBONS

CROSS REFERENCE TO EARLIER APPLICATION

The present application is a National Stage (§ 371) application of PCT/EP2017/077572, filed Oct. 27, 2017, which claims priority benefits of European Application No. 16195974.7, filed Oct. 27, 2016, the disclosure of which is incorporated by reference herein.

FIELD OF THE INVENTION

The present invention relates to a process for producing normally gaseous, normally liquid, and optionally normally solid hydrocarbons from synthesis gas.

BACKGROUND TO THE INVENTION

The Fischer-Tropsch process can be used for the conversion of hydrocarbonaceous feed stocks into liquid and/or solid hydrocarbons. The feed stock (e.g. natural gas, associated gas and/or coal-bed methane, residual oil fractions, coal) is converted in a first step into a mixture of hydrogen and carbon monoxide (this mixture is often referred to as synthesis gas or syngas). The synthesis gas is then converted in a second step over a suitable catalyst at elevated temperature and pressure into predominantly paraffinic compounds ranging from methane to high molecular weight molecules comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi tubular fixed bed reactors, fluidized bed reactors, such as entrained fluidized bed reactors and fixed fluidized bed reactors, and slurry bed reactors such as three-phase slurry bubble columns and ebullated bed reactors. The Fischer-Tropsch reaction is very exothermic and temperature sensitive with the result that careful temperature control is required to maintain optimum operation conditions and desired hydrocarbon product selectivity. Bearing in mind the very high heat of reaction which characterises the Fischer-Tropsch reaction, the heat transfer characteristics and cooling mechanisms of a reactor are very important in order to remove heat efficiently from the reactor and avoid potential temperature runaways and obtain optimal product slate. The heat transfer performance of a fixed-bed reactor operated in trickle mode is limited because of the high gas hold up (low heat capacity), relatively low mass velocity and small catalyst particle size. If one attempts, however, to improve the heat transfer by increasing the gas velocity (and subsequently the reactor temperature), a higher CO conversion could be obtained, but an excessive pressure drop across the reactor may develop, which limits commercial viability. Increasing reactor capacity by increasing gas throughput and CO conversion may also result in increasing radial temperature gradients. For thermal stability and efficient heat removal the Fischer-Tropsch fixed-bed reactor tubes should have a diameter of less than 10 cm and preferably smaller.

The desired use of high activity catalysts in Fischer-Tropsch fixed-bed reactors makes the situation even more challenging. The limited heat transfer performance makes local runaways (hotspots) possible, which may result in local deactivation of the catalyst. In order to avoid runaway reaction the maximum temperature within the reactor must be limited. Moreover, the presence of temperature gradients in the radial and axial directions means that some of the catalyst is operating at sub-optimal conditions. Commercial fixed-bed and three-phase slurry reactors typically utilize boiling water to remove the heat of reaction. In the fixed-bed design, individual reactor tubes are located within a jacket containing water/steam. The heat of reaction raises the temperature of the catalyst bed within each tube. This thermal energy is transferred to the tube wall forcing the water in the surrounded jacket to boil. In the slurry design, cooling tubes are most conveniently placed within the slurry volume and heat is transferred from the liquid continuous matrix to the tube walls. The production of steam within the tubes provides the needed cooling. The steam in turn may be used for heating purposes or to drive a steam turbine.

The presence of a flowing reactant gas in a reactor being liquid-full improves the radial bed conductivity and the wall heat transfer coefficients leading to efficient heat removal and temperature control A potential limitation of the trickle bed system (as well as any of the fixed-bed designs) is the pressure drop associated with operating at high mass velocities. The gas-filled voidage (bed porosity) in fixed-beds (typically less than 0.50) and size and shape of the catalyst particles does not permit high mass velocities without excessive pressure drops. Consequently, the conversion rate per unit reactor volume is limited by heat removal and pressure drop. Increasing catalyst particle size and higher mass flow rates improve heat transfer rates for a given pressure drop. However, the loss of catalyst selectivity and lower catalyst efficiency may make this unattractive.

Three-phase slurry bubble column reactors potentially offer advantages over the fixed-bed design in terms of heat transfer performance. Such reactors typically incorporate small catalyst particles in a liquid continuous matrix. The synthesis gas is bubbled through, maintaining suspension of the catalyst particles and providing the reactants. The motion of the continuous liquid matrix promotes heat transfer to achieve a high commercial productivity. The catalyst particles are moving within a liquid continuous phase, resulting in efficient transfer of heat generated in the catalyst particles to the cooling surfaces. The large liquid inventory in the reactor provides a high thermal inertia, which helps prevent rapid temperature increases that can lead to thermal runaway.

A disadvantage of such a system is that catalyst particles must be removed from the reaction products, as at least part of the reaction products are in the liquid phase under reactor conditions. This separation is typically carried out using an internal or external filtration system. Other issues associated with the use of suspended catalyst particles are non-uniform distribution of catalyst throughout the reactor (with knock-on effects on cooling), foam formation and catalyst attrition.

SUMMARY OF THE INVENTION

The present invention provides for a process for producing normally gaseous, normally liquid, and optionally normally solid hydrocarbons from synthesis gas in a three-phase reactor. The three phase reactor comprising a top middle and bottom part wherein the bottom and top part are fluidly connected via one or more reactor tubes. The one or more reactor tubes comprise randomly stacked catalyst bodies which are held stationary in the reactor tube. The reactor is at least partially filled with a liquid medium. The process comprises the steps of:

(i) introducing the synthesis gas into the reactor via the bottom part; and (ii) contacting the synthesis gas with a stationary catalyst to catalytically convert the synthesis gas at an elevated temperature to obtain the normally gaseous, normally liquid, and optionally normally solid hydrocarbons from synthesis gas;

(iii) withdrawing the normally gaseous, normally liquid, and optionally normally solid hydrocarbons;

wherein the catalyst bodies have an open celled foam structure.

DETAILED DESCRIPTION OF THE INVENTION

The present inventors have found that with the method of the present invention a high C5+ selectivity can be achieved in a Fischer-Tropsch reaction, even at low syngas pressure and high temperature. Hence the method according to the present invention has an increased selectivity towards longer hydrocarbons as compared to prior art methods currently in use. These prior art methods used commercially are based on fixed bed reactors in which syngas flows down through reactor tubes filled with catalyst particles or slurry bed reactors.

It was further found that good selectivity and CO conversion can be obtained over a wider range of H2/CO ratio of the synthesis gas than for prior art methods based on fixed bed or conventional slurry reactors. The catalyst according to the present invention also allows for higher levels of inert compounds (such as N2) in the syngas. Advantageously, the less stringent requirements for the syngas allow for the application of upstream (of the FT reactor) installations (such as the synthesis gas manufacturing unit) meeting less stringent requirements. Such benefits are mainly due to very limited internal diffusion limitations and due to application of thin catalytic layer and high heat transfer coefficients.

As mentioned the Fischer-Tropsch reaction is an exothermic one. An advantage of the present invention is that good heat transfer from the internal of the tubes to the tube wall is established by the movement of the liquid medium through the porous structures. In this way the medium can transport heat from the porous structures to the reactor tube walls. Due to this good heat transfer out of the tubes, tubes having a diameter of up to maximally 12.7 cm (5 inch) may be used. Preferably the maximum diameter is 10.2 cm (4 inch) and most preferred is maximally 7.62 cm (3 inch).

The invention utilizes randomly stacked particles. These randomly stacked particles are obtained by pouring the structured bodies into reactor tubes. As reactor tubes may be used having a larger diameter it is possible to easily load commercial scale reactors. Further these structures are also easily unloaded from the reactor as they can be removed from the bottom of the reactor by letting them flow out of the tubes. This is contrary to what is possible when using monolithic catalysts which will have to be placed manually per tube as they will have to be fitted precisely into each tube.

The particles used in the present invention are preferably disc/cylinder-shaped, sphere-, rectangular-, squared- or polyhedral (including semi regular and regular polyhedral) shaped. These shapes include hexagon, dodecahedron, icosahedron, cuboctahedron or icosidodecahedron shaped. These shapes allow for a good random stacking of the particles. Preferably the particle size is at least 5 mm. In the present application with size of the catalyst body is meant the largest distance measurable along a straight line within a particle.

With normally gaseous, normally liquid, and normally solid hydrocarbons in which the synthesis gas is to be converted is meant hydrocarbons that are respectively gaseous, liquid and solid at room temperature at about 1 atm.

The process according to the present invention for producing normally gaseous, normally liquid, and optionally normally solid hydrocarbons from synthesis gas in a three-phase reactor.

The three phase reactor comprises a top, middle and bottom part wherein the bottom and top part are fluidly connected via one or more reactor tubes. The one or more reactor tubes comprise randomly stacked catalyst bodies which are held stationary in the reactor tube. The reactor is at least partially filled with a liquid medium.

The process of the invention comprises the step of (i) introducing synthesis gas into the reactor via the bottom part of the reactor. The syngas is provided such that the syngas bubbles through the liquid into the tubes. Optionally the syngas is provided directly to the tubes.

The method further comprises a step ii) of contacting the synthesis gas with a stationary catalyst to catalytically convert the synthesis gas at an elevated temperature to obtain the normally gaseous, normally liquid, and optionally normally solid hydrocarbons. As the syngas moves up through the reactor it comes into contact with the randomly stacked catalysts. As the synthesis gas is contacted with the catalyst structure carbon monoxide and hydrogen are converted into hydrocarbons.

In step iii) the normally gaseous, normally liquid, and optionally normally solid hydrocarbons are withdrawn from the reactor.

The catalysts present in the reactor tubes have an open celled foam structure. With open-celled foam structure is meant that the adjacent cells (such as cavities) in the foam are connected with each other such that a fluid can flow from one cell to the other. Since adjacent cells in an open-celled foam are connected with each other a fluid can flow through a catalyst particle according to the present invention. With foam is also meant to include sponge structures. Open-celled foam structure does not include honeycombs and/or monoliths or any other forms which are fully closed in one or more directions. Preferably open structures are used, especially gauzes, sponges or woven structures, especially mats. The open structure in all directions support an almost undisturbed flow of gas and liquid. In that way corrective transport of gas and liquid is possible in all directions.

The pore density is expressed in pores per inch (ppi) or pores per cm (ppc). The pore density is provided by the manufactures of the foam material. These structures are commercially available. The foam material or foam structures may also be referred to as porous substrate material.

The foam structures suitable for the present invention may be obtained in accordance with US2014/004259. In an aspect of the surface roughness of the foam structures is at least 50 µm. In an aspect of the invention the surface roughness lies in the range of 50 to 200 µm. The surface roughness of the substrate material is achieved by the sintered powder particles on a smoother precursor foam. The surface roughness is determined by confocal laser spectroscopy. With surface roughness is meant that the surfaces defining the open celled structure have a texture. This allows for good adherence of the coating comprising the catalytically active component to the foam structure. The inventors have found that, surprisingly, the coating remains largely in place under the harsh conditions of a Fischer-Tropsch reaction. Hence, the surface is not defined by the circumference of the foam particle.

The surface roughness of the foam structures used in the present invention is not obtained by etching. Etching provides for a surface roughness smaller than that required for the present invention. Etching provides for a surface roughness in the Angstrom range. In case foam structures are used which have been roughened by etching an additional buffer layer is required or an adherence layer is required to make the make the catalytic layer adhere sufficiently to the structure. These additional layers have a different thermal expansion coefficient than the foam structure. This difference will result in cracking of the additional layer in case the layered structure is heated. This makes these foams unsuitable for application in exothermic reactions.

A surface roughness of at least 50 μm allows for the application of the catalytically active material directly on the foam structure. A benefit of this direct application is that it simplifies the coating of the foam structure. In addition, as the catalytically active material adheres directly to the foam structure, attrition during transport and use is decreased compared to etched foam structures.

The substrate material is selected from a metal alloy or ceramic material. The substrate material has at least 15 pores per inch. Such materials provide the catalyst particles with good structural strength while having a porous structure which allows for fluid to flow through the material and enough space to develop enough catalytically active materials. In case a metal alloy is used as the substrate material a catalyst body with good thermal conductivity is obtained.

The good thermal conductivity in combination with liquid full operation allows heat generated in the center of the reaction tube to be efficiently transported to the reactor tube wall both via its own conductivity as well as by transport of heat from the particle to the liquid and from the liquid to the tube wall. Heat is mainly transported out of the tubes by the liquid when it flows through the tube. This transport of heat reduces the risk of overheating of the catalyst particles which reduces the life span of the catalyst. It further limits the chance of a thermal runaway (uncontrolled heating up of the reactor).

The catalytically active material is present on the surface of the porous substrate material. This allows for good availability of the catalytically active material during a Fischer-Tropsch reaction both on the outside as inside of the catalyst body.

Since the catalyst bodies are held in a tube during the Fischer-Tropsch reaction they are prevented from entering the product stream. If the particle size is too small i.e. the particle size of particles used in conventional Fischer-Tropsch slurry reactors, the particles cannot be held in a reactor tube sufficiently to prevent some particles from leaving the reactor tube or the reactor. In prior art slurry reactors complicated filter systems are used to filter out catalyst particles from the product stream. Advantageously, for the present invention these complicated filter systems are not required.

The liquid in the reactor is preferably a paraffinic Fischer-Tropsch wax. Other options are commercially available SX70 (Shell) which is preferred for the startup of the reactor.

In an aspect of the present invention the method comprises prior to the step of providing a liquid to the reactor, at least an activation phase. The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the slurry reactor at a molar ratio in the range from 0.4 to 2.5. Preferably, the hydrogen to carbon monoxide molar ratio is in the range from 1.0 to 2.5.

The conditions to be used in the process according to the invention very much resemble the conditions in a slurry reactor. The hydrodynamic properties of the reactor according to the invention are very similar to a gas/liquid bubble column reactor. This is obtained by the very open structure of the catalyst structure, especially the very open structure within the catalyst elements in all directions. The pressure drop of the reactor according to the invention will be the static pressure of the reactor plus 2 bar, preferably the static pressure plus 1 bar, more preferably the static pressure plus 0.5 bar. This is more or less equivalent to a (slurry) bubble column.

The gaseous hourly space velocity, may vary within wide ranges and is typically in the range from 500 to 20,000 Nl/l/h preferably in the range from 700 to 10,000 Nl/l/h (with reference to the volume of porous catalyst elements and the spaces there in-between).

Preferably, the superficial gas velocity of the synthesis gas is in the range from 0.5 to 50 cm/sec, preferably in the range from 5 to 35 cm/sec, more preferably from 10 to 30 cm/sec, with reference to the cross section of the catalyst structure (i.e. the cross section of the reactor minus the cross section occupied by the cooling tubes and any other internal components). The Peclet number of the gas phase is suitably at least 0.1 m$^2$/s, preferably 0.2 m2/s, more preferably 0.5 m$^2$/s. The Peclet number can be calculated from the dispersion coefficient of the gas phase, which dispersion coefficient can be measured for instance by using radioactive tracer experiments. See for instance L-S. Fan, Gas-Liquid-Solid Fluidization Engineering (1989), Chapter 4. In the case that the Peclet number is too low, the slurry height may be increased and/or the gas velocity may be increased. Compartmentalization of the reactor is a further possibility. The reaction is preferably carried out in the coalesced bubble regime. This regime will occur at superficial gas velocities of at least 7 cm/s, preferably 10 cm/s, at column diameter of at least 25 cm, preferably at least 40 cm/s.

Typically, the superficial liquid velocity is kept in the range from 0.001 to 4.00 cm/sec, including liquid production from the Fischer-Tropsch reaction. It will be appreciated that the preferred range may depend on the preferred mode of operation. According to a preferred embodiment, the superficial liquid velocity is kept in the range from 0.005 to 1.0 cm/sec.

According to an aspect of the invention the hydrogen and carbon monoxide molar ratio of the synthesis gas is in the range from 0.4 to 2.5, preferably from 1.0 to 2.4. This makes the technology suitable to be used for converting syngas obtained from all kinds of carbonaceous feedstock like coal, natural gas, associated gas, biomass, off gas from chemical plants and refuse.

According to an aspect of the liquid medium is withdrawn from the top part of the reactor. As the process proceeds after startup the amount of liquid in the reactor increases due to the conversion of CO and H2 into hydrocarbons. In an aspect of the invention the level of liquid medium is monitored and in case the level of liquid medium reaches a predetermined level, liquid is withdrawn in order to lower the level or to maintain the liquid at the predetermined level. Hence, in an aspect of the invention the normally gaseous, normally liquid, and optionally normally solid hydrocarbons are at least partially withdrawn by withdrawing liquid medium.

In an aspect of the invention liquid medium is only withdrawn in step (iii) in case the liquid medium in the reactor reaches a predetermined level.

In an aspect of the invention in step (iii) the normally gaseous, normally liquid, and optionally normally solid hydrocarbons is at least partially withdrawn from the reactor as a gas. Said gas may comprise hydrocarbons but also other compounds like water, carbon dioxide, carbon monoxide, hydrogen and nitrogen. The hydrocarbons may be separated from the other ingredients in the gas and subjected to further treatment like hydrocracking. The other ingredient may be recycled to the Fischer-Tropsch reactor or other processes for further treatment.

In an aspect of the invention at least part of the liquid medium withdrawn from the top part of the reactor is introduced to the bottom part of the reactor. This allows for good circulation of the liquid medium through the reactor tubes providing good heat transfer from the porous structures to walls of the reactor tubes. Further this circulation helps transporting product to the top part of the reactor.

In an aspect of the invention the liquid medium withdrawn from the reactor is filtered. The medium may contain particles originating from for example the porous structures in the reactor tubes. These particles are for example generated during loading of the structures into the tubes.

In an aspect of the invention the reactor comprises multiple reactor tubes and the synthesis gas is provided to each reactor tube. The syngas is preferably provided to each tube separately by a distributor in the bottom part of the reactor. The provision of syngas to each tube contributes to a low pressure drop.

In an aspect of the invention the middle part of the reactor is provided with a cooling medium.

In an aspect of the invention the gaseous hourly space velocity is in the range from 500 to 20,000 Nl/l/h and preferably in the range from 700 to 10,000 Nl/l/h. (with reference to the volume of porous catalyst elements and the spaces there in-between).

In an aspect of the invention the process is carried out at a temperature in the range of from 125 to 350° C., preferably from 175 to 275° C. and more preferably from 200 to 260° C., and a pressure of from 5 to 150 bar abs, preferably from 5 to 80 bar abs.

Preferably, the superficial gas velocity of the synthesis gas is in the range from 0.5 to 50 cm/sec, preferably in the range from 5 to 35 cm/sec, more preferably from 10 to 30 cm/sec, with reference to the cross section of the catalyst structure (i.e. the cross section of the reactor minus the cross section occupied by the cooling tubes and any other internal components). The Peclet number of the gas phase is suitably at least 0.1 m2/s, preferably 0.2 m2/s, more preferably 0.5 m2/s. The Peclet number can be calculated from the dispersion coefficient of the gas phase, which dispersion coefficient can be measured for instance by using radioactive tracer experiments. See for instance L-S. Fan, Gas-Liquid-Solid Fluidization Engineering (1989), Chapter 4. In the case that the Peclet number is too low, the slurry height may be increased and/or the gas velocity may be increased. Compartmentalization of the reactor is a further possibility. The reaction is preferably carried out in the coalesced bubble regime. This regime will occur at superficial gas velocities of at least 7 cm/s, preferably 10 cm/s, at column diameter of at least 25 cm, preferably at least 40 cm/s.

Typically, the superficial liquid velocity is kept in the range from 0.001 to 4.00 cm/sec, including liquid production from the Fischer-Tropsch reaction. It will be appreciated that the preferred range may depend on the preferred mode of operation.

According to one preferred embodiment, the superficial liquid velocity is kept in the range from 0.005 to 1.0 cm/sec.

The invention will be explained further by the following not limiting examples. The appended claims form an integral part of the present description by way of this reference.

EXAMPLES

Experiment 1 (Invention)

The present invention will further be illustrated by the following non limiting example.

A slurry for coating the foam structures with catalyst for Fischer-Tropsch was prepared. A water based mixture containing all base ingredients was prepared by mixing, ensuring all components were well dispersed through the solution to obtain a homogeneous and stable catalyst slurry.

A batch of metal foams was coated by adding a surplus of catalyst slurry. The foams were impregnated with the slurry and in order to facilitate the impregnation, vacuum was applied as mentioned in U.S. Pat. No. 8,497,224. Excess slurry was removed by centrifugal force. A thin layer of catalyst is obtained. The catalyst layer is anchored to the foam surface by drying and calcination. In order to reach the catalyst loading target the coating sequence can be repeated several times but also it can be done in one step.

The coated structures are loaded in a reactor tube. After activation the reactor was subsequently filled with liquid wax. Subsequently synthesis gas was introduced in the bottom of the reactor.

The reactor was operated under differential conditions. The conditions at which the reactor was operated are listed in the Table 1.

The C5+ selectivity is expressed in weight % and STY is defined as amount of hydrocarbon C1+ produced in gram per liter of reactor per hour.

As can be derived from table 1, the randomly packed particles provide for good C5+ selectivity under different process conditions.

TABLE 1

|  | Condition | |
| --- | --- | --- |
|  | 1 | 2 |
| Total pressure (bar) | 36 | 36 |
| Syngas Pressure (bar) | 23 | 21 |
| Temperature (° C.) | 213 | 229 |
| H2/CO [mol/mol] | 1.85 | 1.51 |
| C5+ selectivity (wt %) | 87.9 | 90 |
| STY (g/L__reactor/hr) | 69 | 130 |

While the invention has been described in terms of what are presently considered to be the most practical and preferred embodiments, it is to be understood that the disclosure need not be limited to the disclosed embodiments. It is intended to cover various modifications, combinations and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

That which is claimed is:

1. A process for producing normally gaseous, normally liquid, and optionally normally solid hydrocarbons from synthesis gas in a three-phase reactor, said reactor comprising a top middle and bottom part wherein the bottom and top part are fluidly connected via one or more reactor tubes, wherein one or more reactor tubes comprise randomly stacked catalyst bodies held stationary in the reactor tube and the reactor is at least partially filled with a liquid medium, said process comprising the steps of:
   (i) introducing the synthesis gas into the reactor via the bottom part of the reactor;
   (ii) contacting the synthesis gas with a stationary catalyst to catalytically convert the synthesis gas at an elevated temperature to obtain the normally gaseous, normally liquid, and optionally normally solid hydrocarbons from synthesis gas; and
   (iii) withdrawing the normally gaseous, normally liquid, and optionally normally solid hydrocarbons;
wherein the randomly packed catalyst bodies have an open celled foam structure.

2. The process according to claim 1, wherein the hydrogen and carbon monoxide molar ratio of the synthesis gas is in the range from 0.4 to 2.5.

3. The process according to claim 1, wherein liquid medium is withdrawn from the top part of the reactor.

4. The process according to claim 3, wherein at least part of the liquid medium withdrawn from the top part of the reactor is introduced to the bottom part of the reactor.

5. The process according to claim 4, wherein the liquid medium is filtered.

6. The process according to claim 1, wherein the reactor comprises multiple reactor tubes and the synthesis gas is provided to each reactor tube.

7. The process according to claim 1, wherein in step (iii) the normally gaseous, normally liquid, and optionally normally solid hydrocarbons is at least partially withdrawn by withdrawing liquid medium.

8. The process according to claim 7, wherein liquid medium is only withdrawn in step (iii) in case the liquid medium in the reactor reaches a predetermined level.

9. The process according to claim 1, wherein in step (iii) the normally gaseous, normally liquid, and optionally normally solid hydrocarbons is at least partially withdrawn as a gas.

10. The process according to claim 1, wherein the middle part of the reactor is provided with a cooling medium.

11. The process according to claim 1, wherein the gaseous hourly space velocity is in the range from 500 to 20,000 Nl/l/h.

12. The process according to claim 1, wherein the process is carried out at a temperature in the range of from 125 to 350° C., and a pressure of from 5 to 150 bar abs.

13. The process according to claim 1, wherein the ratio between particle size of the randomly stacked catalyst bodies and tube diameter is from 1:26 to 1:3.

14. The process according to claim 1, wherein the particles are disc/cylinder-shaped, sphere-, rectangular-, squared- or polyhedral shaped.

15. The process according to claim 1, wherein the hydrogen and carbon monoxide molar ratio of the synthesis gas is in the range from 1.0 to 2.4.

16. The process according to claim 1, wherein the gaseous hourly space velocity is in the range from 700 to 10,000 Nl/l/h.

17. The process according to claim 1, wherein the process is carried out at a temperature in the range of from 175 to 275° C.

18. The process according to claim 1, wherein the process is carried out at a temperature in the range of from 200 to 260° C.

19. The process according to claim 1, wherein the process is carried out at a pressure of from 5 to 80 bar abs.

* * * * *